US010801633B2

(12) United States Patent
Marshall et al.

(10) Patent No.: US 10,801,633 B2
(45) Date of Patent: Oct. 13, 2020

(54) AUTOMATIC LEAK PREVENTION SHUT OFF VALVE

(71) Applicant: MISTBOX, INC., Houston, TX (US)

(72) Inventors: Brad Donald Marshall, Houston, TX (US); William S. Nachefski, Houston, TX (US)

(73) Assignee: MISTBOX, INC., Houston, TX (US)

( * ) Notice: Subject to any disclaimer, the term of this patent is extended or adjusted under 35 U.S.C. 154(b) by 0 days.

(21) Appl. No.: 16/640,604

(22) PCT Filed: Aug. 21, 2018

(86) PCT No.: PCT/US2018/047182
§ 371 (c)(1),
(2) Date: Feb. 20, 2020

(87) PCT Pub. No.: WO2019/040405
PCT Pub. Date: Feb. 28, 2019

(65) Prior Publication Data
US 2020/0173570 A1    Jun. 4, 2020

Related U.S. Application Data

(60) Provisional application No. 62/548,951, filed on Aug. 22, 2017.

(51) Int. Cl.
*F16K 17/28* (2006.01)
*F16K 31/122* (2006.01)
(52) U.S. Cl.
CPC .......... *F16K 17/28* (2013.01); *F16K 31/1223* (2013.01)

(58) Field of Classification Search
None
See application file for complete search history.

(56) References Cited

U.S. PATENT DOCUMENTS

| 2,679,261 A | 5/1954 | Otis |
| 2,900,997 A | 8/1959 | Bostock |
| 3,741,241 A | 6/1973 | Jackson |
| 3,756,272 A | 9/1973 | Hammond |
| 4,683,905 A | 8/1987 | Vigneau |
| 5,462,081 A | 10/1995 | Perusek |

OTHER PUBLICATIONS

International Search Report and Written Opinion dated Oct. 16, 2018 for corresponding PCT/US2018/047182.

*Primary Examiner* — John Fox
(74) *Attorney, Agent, or Firm* — Ramey & Schwaller, LLP; Daniel J. Krueger; Craig A. Buschmann

(57) ABSTRACT

A valve body has an outside surface and a cylinder. The cylinder has an inlet chamber and an outlet chamber. A piston has a head at one end and a foot at the end opposite the head and a piston body between the head and the foot. A cross channel extends from a first side of the piston body. A longitudinal channel is in fluid communication with the cross channel and extends to the outlet chamber. The piston is positioned in the cylinder so that it can be moved to an open position in which the cross channel is in fluid communication with the inlet chamber and a closed position in which the cross channel is not in fluid communication with the inlet chamber. The piston is actuated between the two positions by a differential in pressure between the inlet chamber and the outlet chamber.

14 Claims, 9 Drawing Sheets

AUTOMATIC LEAK PREVENTION SHUT OFF VALVE

REFERENCE TO EARLIER FILED APPLICATIONS

The present application is a 371 National Phase Application of PCT/US2018/047182 filed Aug. 21, 2018 and titled Automated Leak Prevention Shut Off Valve, which in turn claims priority to and the benefit of U.S. Provisional Patent Application Ser. No. 62/548,951 filed Aug. 22, 2017 and titled Automated Leak Prevention Shut Off Valve, the disclosures of which are incorporated in their entirety by this reference.

BACKGROUND

Water-based cooling systems for air conditioner compressors typically use water supplied from a home or office water system. A controller for the water-based cooling system is typically connected to the home or office water system by a hose. Such a hose is vulnerable to breaks or holes caused, for example, by a dog chewing a hole in the hose or a lawn mower running over the hose. Such a hole could result in waste of water, damage caused by the escaped water, and/or other economic damage. Preventing water from escaping from a water-based cooling system as a result of such an incident is a challenge.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

A hollow housing assembled with an internal body that moves to allow a fluid communication channel linking an inlet chamber and an outlet chamber to be in an open or closed state wherein the impetus for movement of the internal body is the differential of pressure in the inlet chamber and the outlet chamber.

Figure 1:
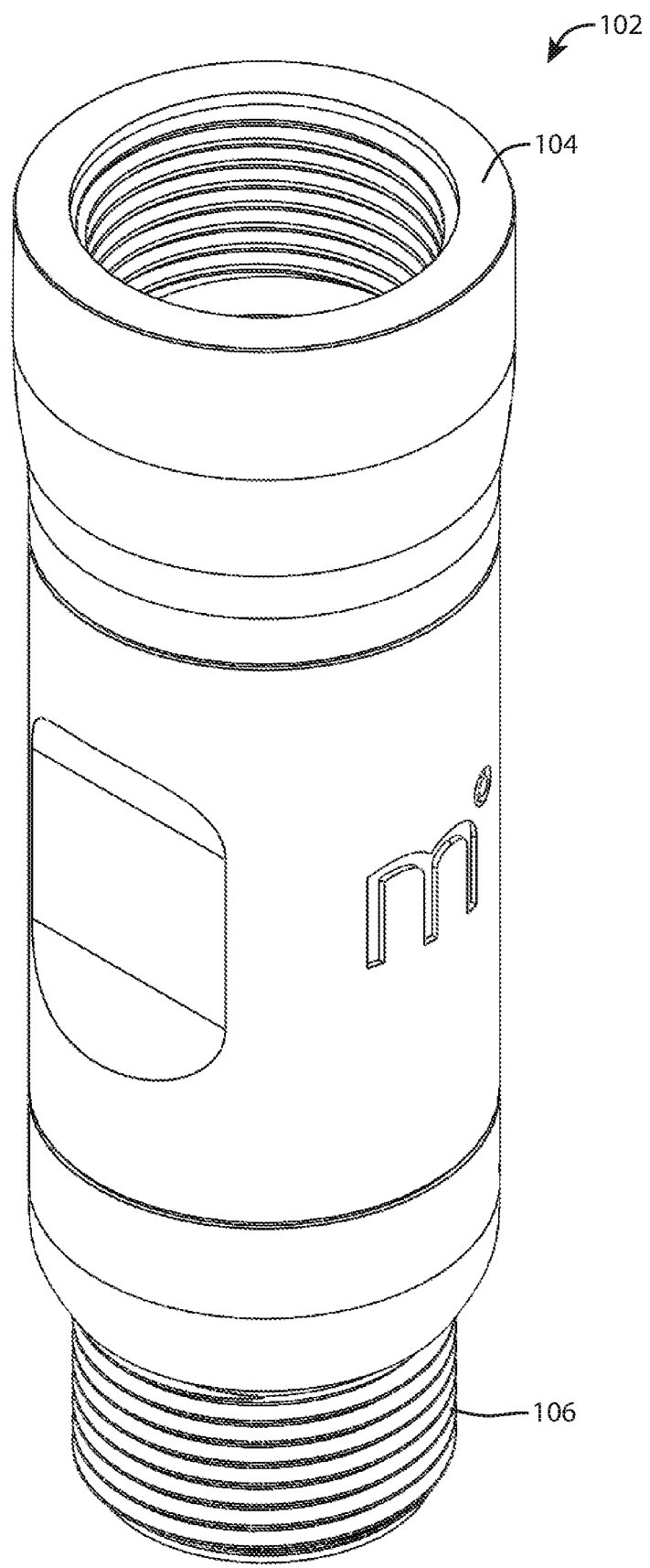
FIG. 1 is a perspective view of an automatic leak prevention shut off valve.

FIG. 1 is a perspective view of an automatic leak prevention shut off valve. While the following discussion focuses on automatic leak protection in the context of a water supply for a water-based cooling system controller, it will be understood that the techniques and equipment described herein can be applied to any other system in which it is desired to provide automatic leak protection for the supply or routing of any fluid (gas or liquid). An automatic leak prevention shut off valve 102 has a hose bibb connection end 104 and a hose end 106. A user, such as a home owner, secures the hose bibb connection end 104 of the automatic leak prevention shut off valve 102 to the house hose bibb or other water connection (not shown), for example by screwing the hose bibb connection end 104 of the automatic leak prevention shut off valve 102 onto the hose bibb. The user then connects the hose or other pipe from a water-based cooling system controller (not shown) to the hose end 106 of the automatic leak prevention shut off valve 102. Such a connection provides water to the water-based cooling system controller (not shown) as allowed by the automatic leak prevention shut off valve 102. It will be understood that the foregoing is merely an example and that there are other ways of connecting into a water supply (or fluid supply) and that those ways are intended to be covered by the attached claims.

Figure 2:
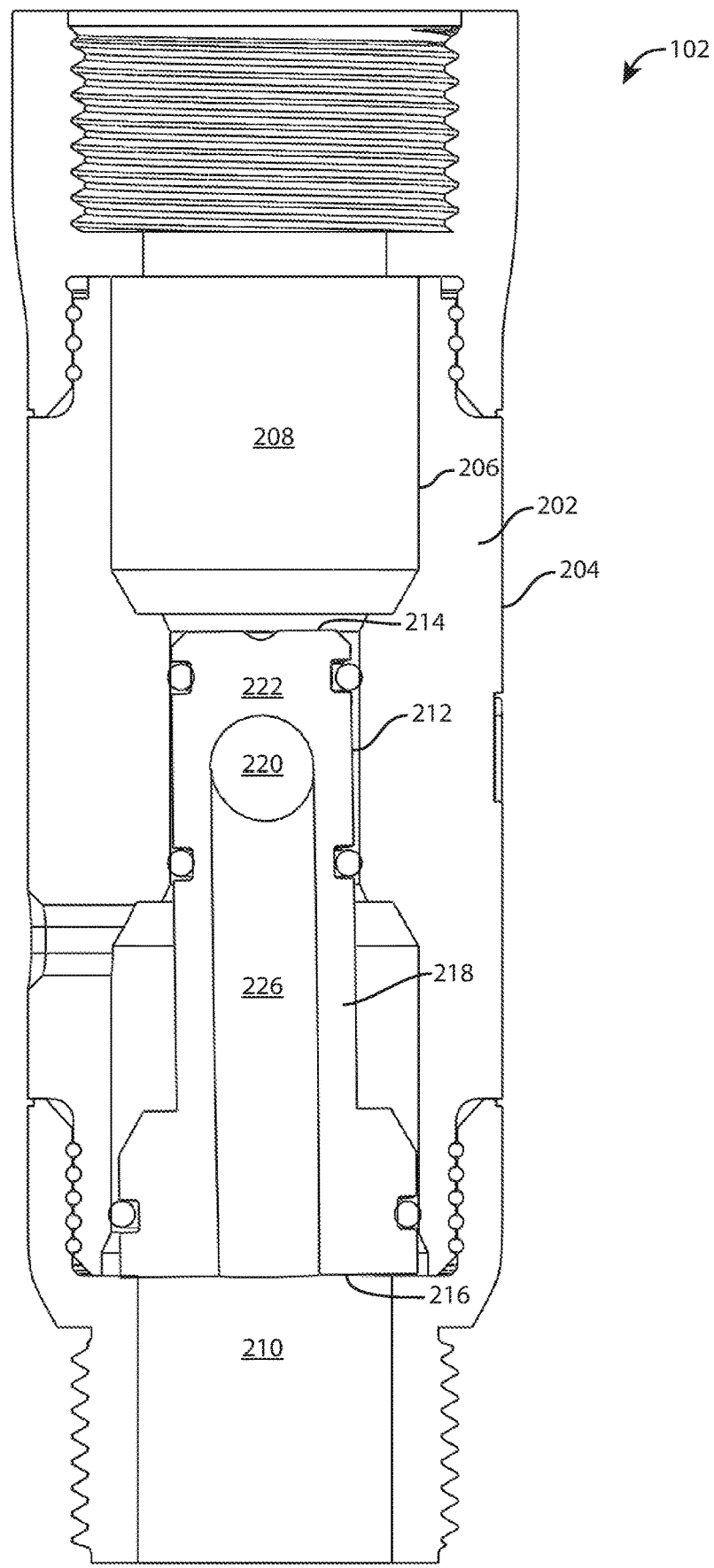
FIG. 2 is a cross-sectional view of the automatic leak prevention shut off valve of FIG. 1.
Figure 3:
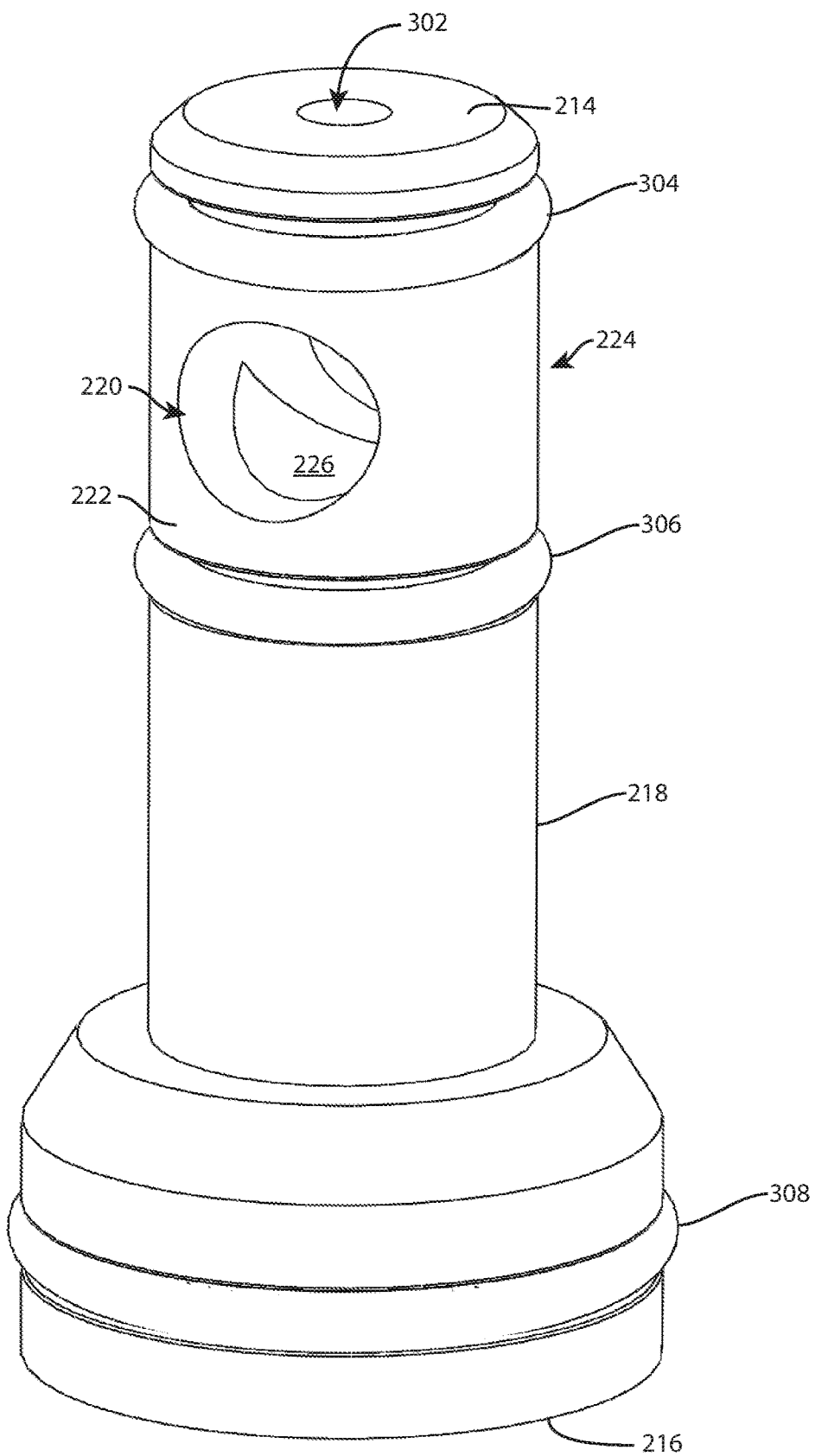
FIG. 3 is a perspective view of a piston for the automatic leak prevention shut off valve of FIG. 1.
Figure 4:
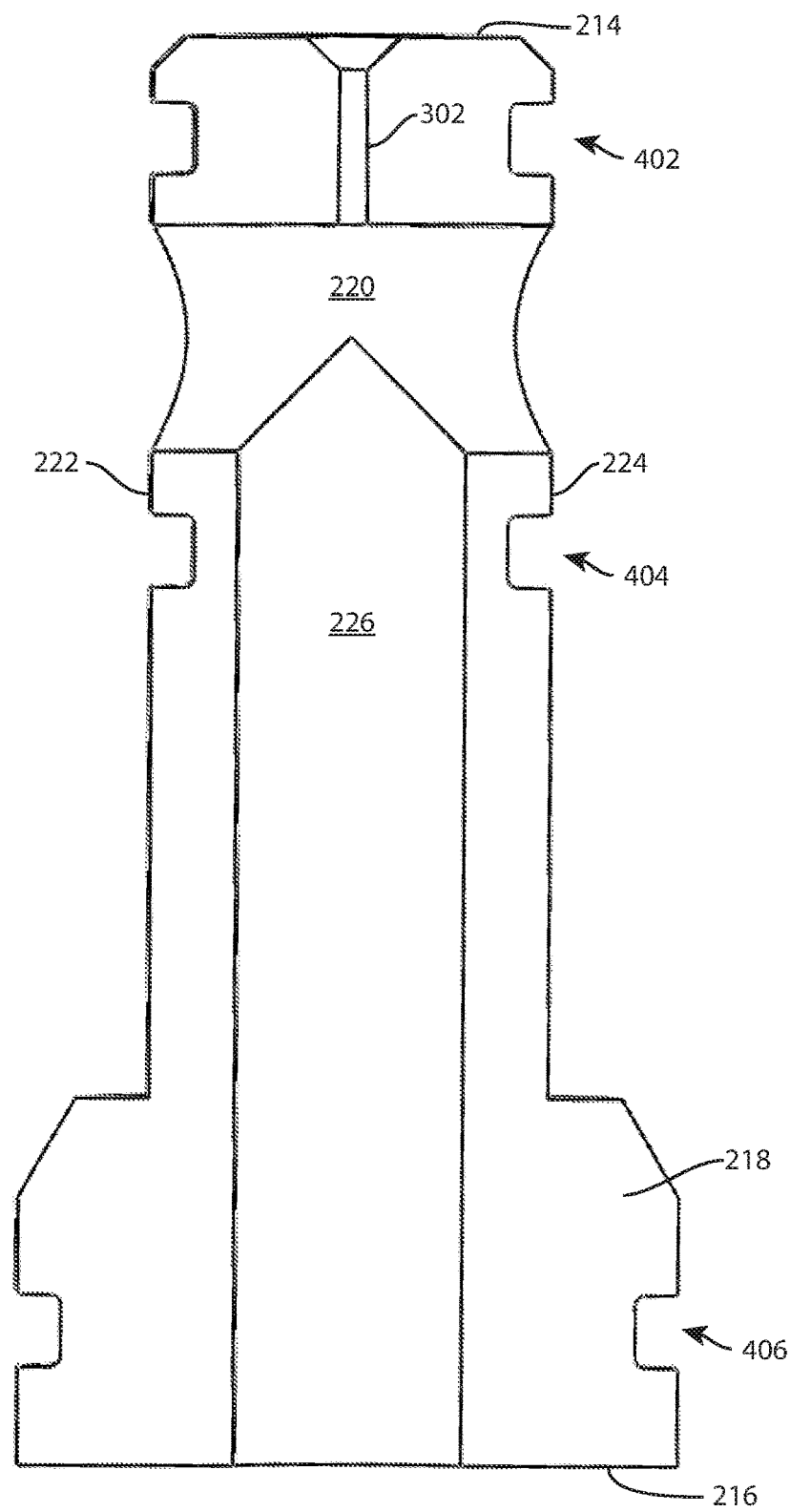
FIG. 4 is a cross-sectional view of a piston for the automatic leak prevention shut off valve of FIG. 1.

FIG. 2 is a cross-sectional view of the automatic leak prevention shut off valve of FIG. 1. FIG. 3 is a perspective view of a piston for the automatic leak prevention shut off valve of FIG. 1. FIG. 4 is a cross-sectional view of a piston for the automatic leak prevention shut off valve of FIG. 1.

The automatic leak prevention shut off valve 102 includes a valve body 202 having an outside surface 204 and a cylinder 206. The cylinder 206 has an inlet chamber 208 and an outlet chamber 210. The inlet chamber 208 is in fluid communication with the hose bibb connection end 104 of the automatic leak prevention shut off valve 102 and the outlet chamber 210 is in fluid communication with the hose end 106 of the automatic leak prevention shut off valve 102.

The automatic leak prevention shut off valve 102 includes a piston 212 having a head 214 at one end of the piston 212 and a foot 216 at the end of the piston 212 opposite the head 214 and a piston body 218 between the head 214 and the foot 216. The piston 212 has a cross channel 220 extending from a first side 222 of the piston body 218 to a second side 224 (not shown in FIG. 2 but shown in FIG. 4) of the piston body 218 opposite the first side 222 of the piston body 218. The piston 212 has a longitudinal channel 226 in fluid communication with the cross channel 220 and extending to and penetrating the foot 216 of the piston 212. In one or more embodiments, the cross channel 220 does not extend through the piston body 218 to the second side 224.

The piston 212 is positioned in the cylinder 206 so that the piston 212 can be moved to (a) an open position in which the head 214 extends into the inlet chamber 208 and the cross channel 220 is in fluid communication with the inlet chamber 208, and (b) a closed position in which the head 214 does not extend into the inlet chamber 208 and the cross channel 220 is not in fluid communication with the inlet chamber 208. The head 214 has a head surface area perpendicular to the longitudinal direction, i.e., the direction along which the longitudinal channel 226 extends, and the foot 216 having a foot surface area perpendicular to the longitudinal direction. The foot surface area is larger than the head surface area.

The piston is sealed by O-rings 304, 306, 308 (shown in FIG. 3), which fit into O-ring slots 402, 404, 406 (shown in FIG. 4).

In one or more embodiments, the automatic leak prevention shut off valve 102 includes a pilot hole 302 (seen in FIGS. 3 and 4) extending through the head 214 of the piston 212 to the cross channel 220.

In use, the hose bibb connection end 104 of the automatic leak prevention shut off valve 102 of FIG. 1 is connected to a source of water, such as a hose bibb, and the hose end 106 is coupled to a hose or pipe leading to the water-based cooling system controller. Water passes from the hose bibb into the inlet chamber 208 causing the piston to move into the position shown in FIG. 2. Water from the inlet chamber passes through the pilot hole 302, through the cross channel 220, and through the longitudinal channel 226 to the outlet chamber 210. Water flows out of the outlet chamber 210 into the hose, which, after a period of time, pressurizes the hose and the outlet chamber 210. Since the cross-sectional area of the foot 216 is larger than that of the head 214, the pressurization of the outlet chamber 210 causes the piston 212 to move up in the cylinder 206 so that the head 214 of the piston 212 is moved into the inlet chamber 208 and the cross channel 220 and the longitudinal channel 226 are in direct fluid communication with the inlet chamber 208, which further increases flow to the hose and further pressurizes the outlet chamber 210.

If pressure in the hose is lost, for example because of one of the causes described above, pressure is also lost in the outlet chamber 210. Since water from the hose bibb is still exerting pressure on the head 214 of the piston 212, loss of pressure in the outlet chamber 210 will cause the piston 212 to move down in the cylinder 206 until it reaches the position shown in FIG. 2 in which the cross channel 220 and the longitudinal channel 226 are no longer in fluid communication with the inlet chamber 208. This will limit the water released through the damaged hose or pipe to that which flows through the pilot hole 302.

Figure 5:
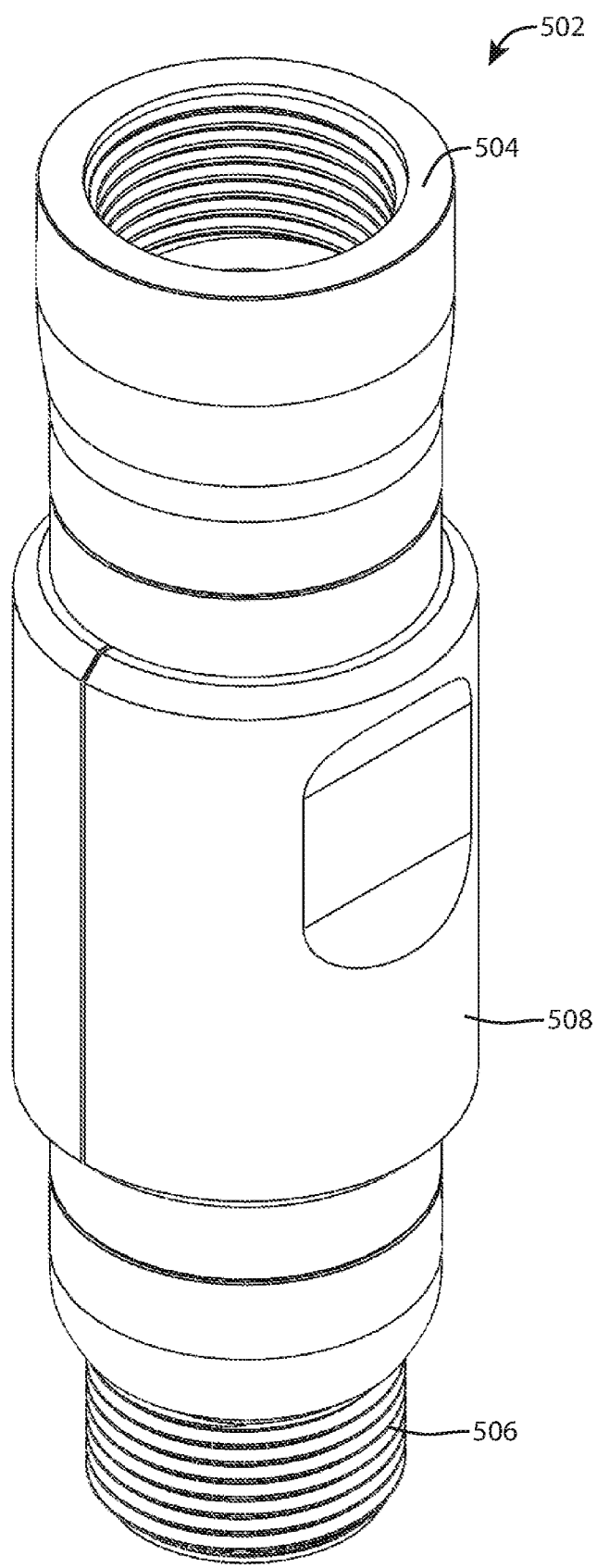
FIG. 5 is a perspective view of an automatic leak prevention shut off valve.

FIG. 5 is a perspective view of an automatic leak prevention shut off valve. An automatic leak prevention shut off valve 502 has a hose bibb connection end 504 and a hose end 506. A user, such as a home owner, secures the hose bibb connection end 504 of the automatic leak prevention shut off valve 502 to the house hose bibb or other water connection (not shown), for example by screwing the hose bibb connection end 504 of the automatic leak prevention shut off valve 502 onto the hose bibb. The user then connects the hose or other pipe from a water-based cooling system controller (not shown) to the hose end 506 of the automatic leak prevention shut off valve 502. Such a connection provides water to the water-based cooling system controller (not shown) as allowed by the automatic leak prevention shut off valve 502.

The automatic leak prevention shut off valve includes a piston-holding apparatus 508 that allows the hose to be filled and pressurized more quickly than with the embodiment shown in FIGS. 1-4.

Figure 6:
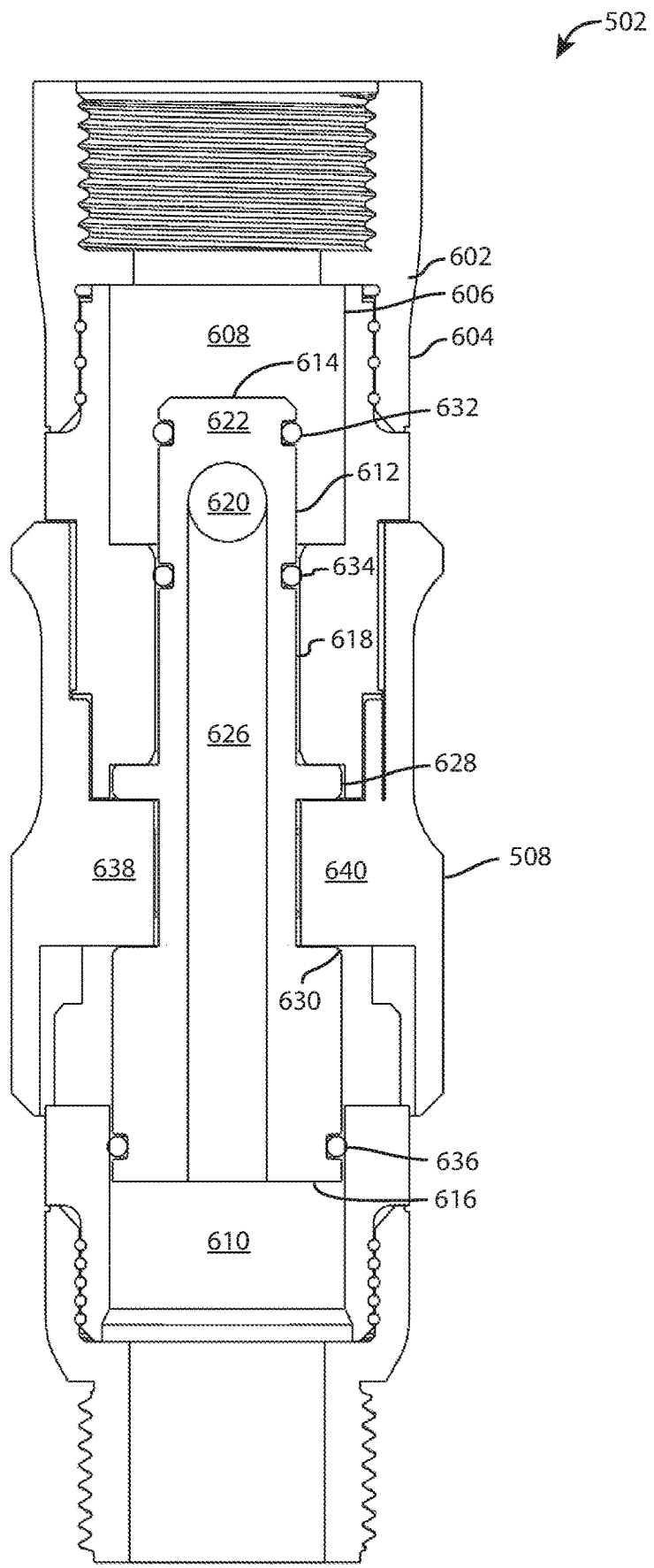
FIG. 6 is a cross-sectional view of the automatic leak prevention shut off valve of FIG. 5.
Figure 7:
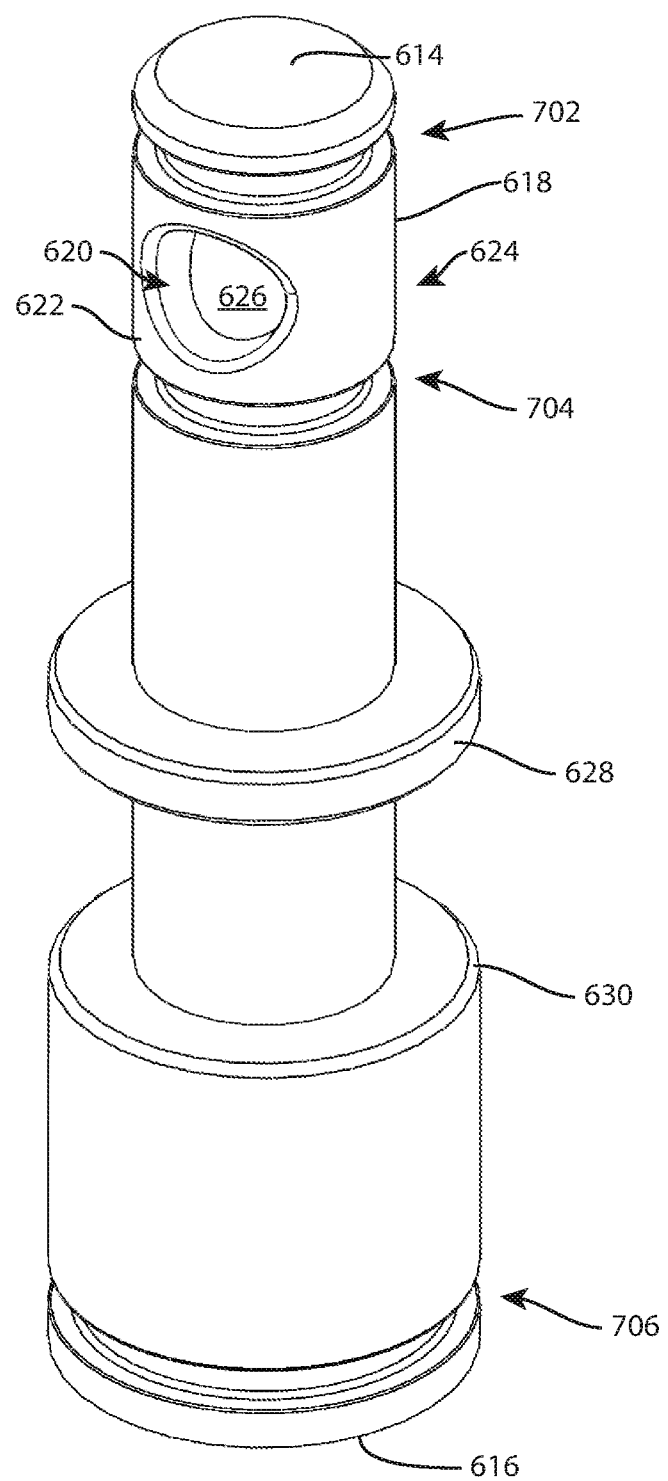
FIG. 7 is a perspective view of a piston for the automatic leak prevention shut off valve of FIG. 5.
Figure 8:
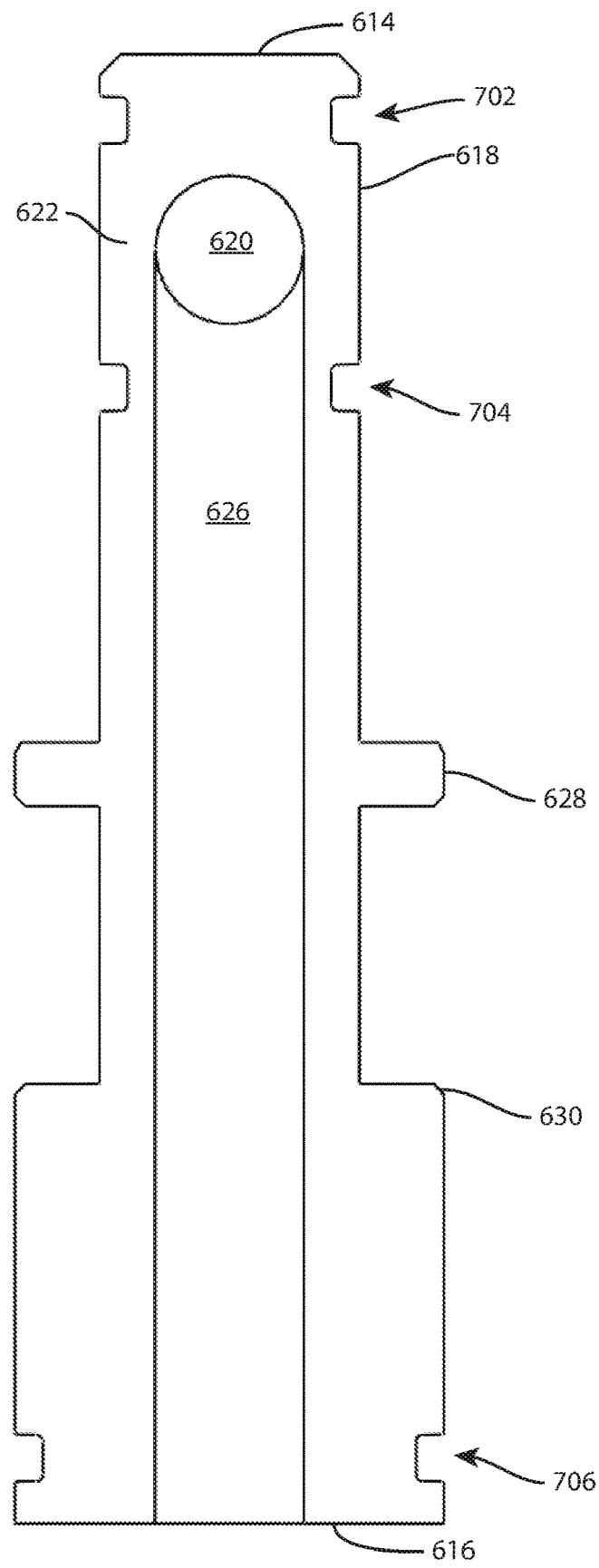
FIG. 8 is a cross-sectional view of a piston for the automatic leak prevention shut off valve of FIG. 5.

FIG. 6 is a cross-sectional view of the automatic leak prevention shut off valve of FIG. 5. FIG. 7 is a perspective view of a piston for the automatic leak prevention shut off valve of FIG. 5. FIG. 8 is a cross-sectional view of a piston for the automatic leak prevention shut off valve of FIG. 5.

The automatic leak prevention shut off valve 502 includes a valve body 602 having an outside surface 604 and a cylinder 606. The cylinder 606 has an inlet chamber 608 and an outlet chamber 610. The inlet chamber 608 is in fluid communication with the hose bibb connection end 504 of the automatic leak prevention shut off valve 502 and the outlet chamber 610 is in fluid communication with the hose end 506 of the automatic leak prevention shut off valve 502.

The automatic leak prevention shut off valve 502 includes a piston 612 having a head 614 at one end of the piston 612 and a foot 616 at the end of the piston 612 opposite the head 614 and a piston body 618 between the head 614 and the foot 616. The piston 612 has a cross channel 620 extending from a first side 622 of the piston body 618 to a second side 624 (not shown in FIG. 6 but shown in FIG. 8) of the piston body 618 opposite the first side 622 of the piston body 618. The piston 612 has a longitudinal channel 626 in fluid communication with the cross channel 620 and extending to and penetrating the foot 616 of the piston 612. In one or more embodiments, the cross channel 620 does not extend through the piston body 618 to the second side 624.

In one or more embodiments, the piston 612 includes a flange 628 extending from the side of the piston 612. In one or more embodiments, the flange 628 is located between the head 614 of the piston 612 and the foot 616 of the piston 612. In one or more embodiments, the piston 612 includes a shoulder 630 extending from the side of the piston 612 and located between the flange 628 of the piston 612 and the foot 616 of the piston 612.

The piston 612 is positioned in the cylinder 606 so that the piston 612 can be moved to (a) an open position in which the head 614 extends into the inlet chamber 608 and the cross channel 620 is in fluid communication with the inlet chamber 608, and (b) a closed position in which the head 614 does not extend into the inlet chamber 608 and the cross channel 620 is not in fluid communication with the inlet chamber 608. The head 614 has a head surface area perpendicular to the longitudinal direction, i.e., the direction along which the longitudinal channel 626 extends, and the foot 616 having a foot surface area perpendicular to the longitudinal direction. The foot surface area is larger than the head surface area.

In one or more embodiments, the piston-holding apparatus 508 includes one or more tabs 638, 640 (while only two are shown, it will be understood that additional tabs could be provided) that fit into a tab slot of the valve body 602 (i.e., a hole in the valve body 602 through which the tabs 636 can fit) and between the flange 628 of the piston 612 and the shoulder 630 of the piston 612.

The piston is sealed by O-rings 632, 634, 636, which fit into O-ring slots 702, 704, 706 (shown in FIG. 7).

Figure 9:
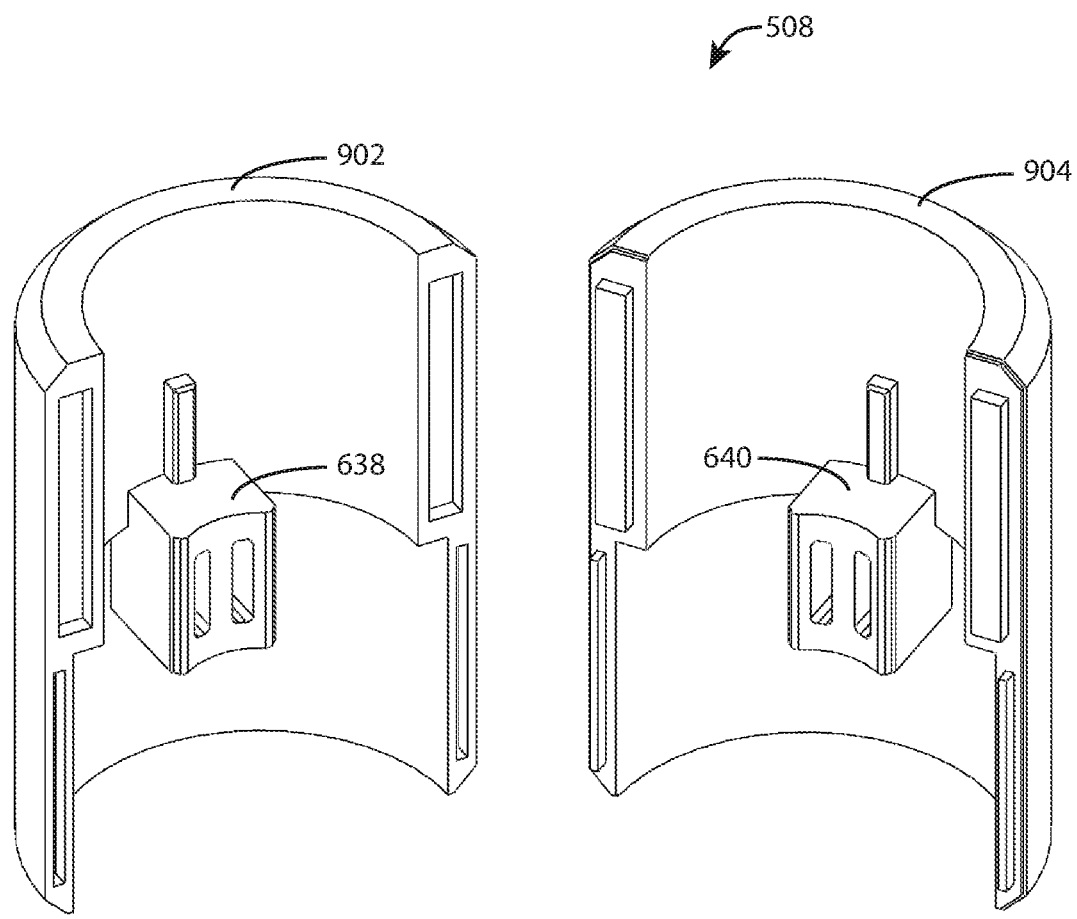
FIG. 9 is a perspective view of a disassembled outer sleeve for the automatic leak prevention shut off valve of FIG. 5.

FIG. 9 is a perspective view of a disassembled piston-holding apparatus for the automatic leak prevention shut off valve of FIG. 5. In one or more embodiments, the piston-holding apparatus 508 is split into two parts 902 and 904 which have various mating mechanisms, shown in FIG. 9, for locking the two parts 902, 904 together. The tabs 638, 640 are shown extending from the two parts 902, 904.

In use, the hose bibb connection end 504 of the automatic leak prevention shut off valve 502 of FIG. 5 is connected to a source of water, such as a hose bibb, and the hose end 506 is coupled to a hose or pipe leading to the water-based cooling system controller. Water passes from the hose bibb into the inlet chamber 608. There is no pilot hole 302 in the embodiment shown in FIGS. 5-9. Instead, the piston-holding apparatus 508 is used by the user, through the interaction between the tabs 638, 640 and the flange 628 and shoulder 630 on the piston 612 to push the piston 612 to the open position as shown in FIG. 6.

Water from the inlet chamber 608 passes through the cross channel 620, and through the longitudinal channel 626 to the outlet chamber 610. Water flows out of the outlet chamber 610 into the hose, which, after a period of time, pressurizes the hose and the outlet chamber 610. Since the cross-sectional area of the foot 616 is larger than that of the head 614, the pressurization of the outlet chamber 610 causes the piston 612 to move up in the cylinder 606 so that the head 614 of the piston 612 is moved into the inlet chamber 608 and the cross channel 620 and the longitudinal channel 626 are in direct fluid communication with the inlet chamber 608, which further increases flow to the hose and further pressurizes the outlet chamber 610.

If pressure in the hose is lost, for example because of one of the causes described above, pressure is also lost in the outlet chamber 610. Since water from the hose bibb is still exerting pressure on the head 614 of the piston 612, loss of pressure in the outlet chamber 610 will cause the piston 612 to move down in the cylinder 606 until it reaches the closed position in which the cross channel 220 and the longitudinal channel 226 are no longer in fluid communication with the inlet chamber 208. This will shut off the water so that no more water is released through the damaged hose or pipe.

It will be understood that the piston-holding apparatus shown in FIGS. 5, 6 and 9 is merely an example. Other possibilities include a button that can be pressed into, for example, the volume between the flange 628 and the shoulder 630. Alternatively, a screw mechanism can advance an arm into the volume between the flange 628 and the shoulder 630 upon rotation of the screw mechanism. The screw mechanism can be an axial mechanism or it can be longitudinally aligned with the piston 612.

It will be understood that other techniques and approaches are possible. For example, the design may not include a piston or cylinder and the cross channel 220, 620 and longitudinal channel 226, 626 need not be in the piston but can be routed, for example, through the valve body. Further, the head 214, 614 and foot 216, 616 surfaces need not be perpendicular to the longitudinal direction. Instead, the movement could be accomplished with a body that slides sideways or pivots between open and closed positions, for example.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus comprising:
   a valve body having an outside surface and a cylinder, the cylinder having an inlet chamber and an outlet chamber, wherein the valve body includes a tab slot that penetrates the outside surface of the valve body between the inlet chamber and the outlet chamber;
   a piston having a head at one end of the piston and a foot at the end of the piston opposite the head and a piston body between the head and the foot, wherein the piston further comprises;
      a flange extending from the side of the piston and located between the head of the piston and the foot of the piston; and,
      a shoulder extending from the side of the piston and located between the flange of the piston and the foot of the piston;
   a piston-holding device that engages the flange and the shoulder to allow movement of the piston from the closed position to the open position;
   a cross channel extending from a first side of the piston body;
   a longitudinal channel in fluid communication with the cross channel and extending to the outlet chamber;
   wherein the piston is positioned in the cylinder so that the piston can be moved to:
      an open position in which the cross channel is in fluid communication with the inlet chamber; and,
      a closed position in which the cross channel is not in fluid communication with the inlet chamber;
   wherein the piston is actuated between the open position and the closed position by a differential in pressure between the inlet chamber and the outlet chamber.

2. The apparatus of claim 1 wherein:
   the piston has a head at one end of the piston and a foot at the end of the piston opposite the head and a piston body between the head and the foot;
   the head has a head surface area perpendicular to the longitudinal direction and the foot having a foot surface area perpendicular to the longitudinal direction;
   wherein the foot surface area is larger than the head surface area, in the open position the head extends into the inlet chamber, and in the closed position the head does not extend into the inlet chamber.

3. The apparatus of claim 1 further comprising a pilot hole extending through the head of the piston to the cross channel.

4. The apparatus of claim 1 wherein the piston-holding device comprises an outer sleeve slidably coupled to the valve body, wherein the outer sleeve has a tab that fits into the tab slot of the valve body and between the flange of the piston and the shoulder of the piston.

5. The apparatus of claim 4 wherein the outer sleeve includes a gripper indent by which the outer sleeve can be gripped for movement relative to the valve body.

6. A method for automatic leak protection comprising:
   coupling a hose bibb connection end of an automatic leak prevention shut off valve to a source of fluid, the automatic leak prevention shut off valve having:
      a valve body having an outside surface and a cylinder, the cylinder having an inlet chamber and an outlet chamber, wherein the valve body includes a tab slot that penetrates the outside surface of the valve body between the inlet chamber and the outlet chamber;
      a piston having a head at one end of the piston and a foot at the end of the piston opposite the head and a piston body between the head and the foot;
      wherein the piston further comprises;
         a flange extending from the side of the piston and located between the head of the piston and the foot of the piston; and,
         a shoulder extending from the side of the piston and located between the flange of the piston and the foot of the piston;

a piston-holding device that engages the flange and the shoulder to allow movement of the piston from the closed position to the open position;
a cross channel extending from a first side of the piston body;
a longitudinal channel in fluid communication with the cross channel and extending to the outlet chamber;
wherein the piston is positioned in the cylinder so that the piston can be moved to:
an open position in which the cross channel is in fluid communication with the inlet chamber; and;
a closed position in which the cross channel is not in fluid communication with the inlet chamber;
wherein the piston is actuated between the open position and the closed position by a differential in pressure between the inlet chamber and the outlet chamber;
coupling a hose end of the automatic leak prevention shut off valve to a pipe;
flowing fluid from the source of fluid into the inlet chamber, through the cross channel, through the longitudinal channel, through the outlet chamber, and into the pipe, pressurizing the pipe;
losing pressure in the pipe causing the piston to actuate from the open position to the closed position; and,
actuating the piston-holding device to move the piston into the open position.

7. The method of claim 6 wherein the piston includes a pilot hole extending through the head of the piston to the cross channel and flowing fluid flowing fluid from the source of fluid into the inlet chamber and through the cross channel includes flowing fluid from the inlet chamber through the pilot hole.

8. The method of claim 6 wherein the piston-holding device comprises an outer sleeve slidably coupled to the valve body, wherein the outer sleeve has a tab that fits into the tab slot of the valve body and between the flange of the piston and the shoulder of the piston.

9. The method of claim 8 wherein the outer sleeve includes a gripper indent by which the outer sleeve can be gripped for movement relative to the valve body.

10. A system comprising:
a valve body having an outside surface and a cylinder, the cylinder having an inlet chamber and an outlet chamber, wherein the valve body includes a tab slot that penetrates the outside surface of the valve body between the inlet chamber and the outlet chamber;
a hose bibb connection coupled to the inlet chamber;
a hose end coupled to the outlet chamber;
a source of fluid coupled to the hose bibb connection; a pipe coupled to the hose end;
a piston having a head at one end of the piston and a foot at the end of the piston opposite the head and a piston body between the head and the foot, wherein the piston further comprises;
a flange extending from the side of the piston and located between the head of the piston and the foot of the piston; and,
a shoulder extending from the side of the piston and located between the flange of the piston and the foot of the piston;
a piston-holding device that engages the flange and the shoulder to allow movement of the piston from the closed position to the open position;
a cross channel extending from a first side of the piston body;
a longitudinal channel in fluid communication with the cross channel and extending to the outlet chamber;
wherein the piston is positioned in the cylinder so that the piston can be moved to:
an open position in which the cross channel is in fluid communication with the inlet chamber; and,
a closed position in which the cross channel is not in fluid communication with the inlet chamber;
wherein the piston is actuated between the open position and the closed position by a differential in pressure between the inlet chamber and the outlet chamber.

11. The system of claim 10 wherein:
the piston has a head at one end of the piston and a foot at the end of the piston opposite the head and a piston body between the head and the foot;
the head has a head surface area perpendicular to the longitudinal direction and the foot having a foot surface area perpendicular to the longitudinal direction;
wherein the foot surface area is larger than the head surface area, in the open position the head extends into the inlet chamber, and in the closed position the head does not extend into the inlet chamber.

12. The system of claim 10 further comprising a pilot hole extending through the head of the piston to the cross channel.

13. The system of claim 10 wherein the piston-holding device comprises an outer sleeve slidably coupled to the valve body, wherein the outer sleeve has a tab that fits into the tab slot of the valve body and between the flange of the piston and the shoulder of the piston.

14. The system of claim 13 wherein the outer sleeve includes a gripper indent by which the outer sleeve can be gripped for movement relative to the valve body.

* * * * *